US012809088B2

(12) United States Patent
Sakai et al.

(10) Patent No.: US 12,809,088 B2
(45) Date of Patent: Nov. 24, 2026

(54) IMAGE DISPLAY APPARATUS

(71) Applicant: CANON KABUSHIKI KAISHA, Tokyo (JP)

(72) Inventors: Yosuke Sakai, Tochigi (JP); Yuuki Maeda, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 18/829,340

(22) Filed: Sep. 10, 2024

(65) Prior Publication Data

US 2025/0116815 A1 Apr. 10, 2025

(30) Foreign Application Priority Data

Oct. 4, 2023 (JP) ................................ 2023-172700

(51) Int. Cl.
*G02B 6/27* (2006.01)

(52) U.S. Cl.
CPC ......... *G02B 6/2773* (2013.01); *G02B 6/2726* (2013.01)

(58) Field of Classification Search
CPC .. G02B 6/2726; G02B 6/0016; G02B 6/0033; G02B 6/0035; G02B 6/0041
See application file for complete search history.

(56) References Cited

U.S. PATENT DOCUMENTS

| | | | | |
|---|---|---|---|---|
| 10,725,368 | B2 | 7/2020 | Maeda | |
| 10,845,581 | B2 | 11/2020 | Maeda | |
| 10,866,498 | B2 | 12/2020 | Maeda | |
| 2015/0316781 | A1 | 11/2015 | Maeda | |
| 2018/0284445 | A1 * | 10/2018 | Matsuki | G02B 27/0172 |
| 2023/0236489 | A1 | 7/2023 | Maeda | |
| 2024/0094540 | A1 | 3/2024 | Sakai | |
| 2025/0044496 | A1 | 2/2025 | Maeda | |
| 2025/0116829 | A1 | 4/2025 | Maeda | |

FOREIGN PATENT DOCUMENTS

| | | | |
|---|---|---|---|
| JP | 2018-165743 | A | 10/2018 |
| WO | 2018/221026 | A1 | 12/2018 |

* cited by examiner

*Primary Examiner* — Chad H Smith
(74) *Attorney, Agent, or Firm* — Carter, DeLuca & Farrell LLP

(57) ABSTRACT

An image display apparatus includes an image display element configured to emit image light, and a light guide plate that includes an entrance portion which the image light enters, and an exit portion from which the image light exits. The exit portion includes, in order from an entrance portion side, a first separation surface, and a second separation surface. Each of the first separation surface and the second separation surface is configured to separate incident light into reflected light and transmitting light. Predetermined inequalities are satisfied.

7 Claims, 19 Drawing Sheets

IMAGE DISPLAY APPARATUS

BACKGROUND

Technical Field

One of the aspects of the embodiments relates to an image display apparatus having a light guide plate configured to guide a display image (light) to a pupil of an observer.

Description of Related Art

An image display apparatus having a light guide plate configured to guide a display image to the observer's pupil has conventionally been known. FIG. 18 is a conceptual diagram of light beams propagating inside the light guide plate of a conventional image display apparatus. Light beams L10, L20, and L30 emitted from pixels of an image display element 110 pass through a projection optical system 1200, enter an entrance portion 1310 at different incident angles, are deflected, and then propagate inside a light guide plate 130 at different total reflection angles α10, α20, and α30 (α10<α20<α30). A part of the light beam incident on an exit portion 132 is deflected and travels toward a pupil SP of an observer, and the other light beams propagate inside the light guide plate 130 by total reflections and enter the exit portion 132. In the conventional image display apparatus, the width of an area (effective area) where the lights L10, L20, and L30 overlap one another at the position of the observer's pupil SP is smaller than the width of the light beam emitted from the exit portion 132, and a large amount of unnecessary light is generated in the effective area, and the light utilization efficiency significantly decreases.

Japanese Patent Laid-Open No. 2018-165743 discloses a configuration configured to set a proper incident angle range with high reflectance and low incident angle dependency to a plurality of separation surfaces tilted at the same angle in order to increase the intensity of each light beam incident on the observer's pupil. PCT International Publication WO2018/221026 discloses a configuration configured to set different light reflectances to a plurality of half-transmission layers based on angle dependency so as to reflect light of an angle component incident on the observer's pupil and transmit light of another angle component in order to improve the light guide efficiency.

SUMMARY

An image display apparatus according to one aspect of the disclosure includes an image display element configured to emit image light, and a light guide plate that includes an entrance portion which the image light enters, and an exit portion from which the image light exits. The exit portion includes, in order from an entrance portion side, a first separation surface, and a second separation surface. Each of the first separation surface and the second separation surface is configured to separate incident light into reflected light and transmitting light. The following inequalities are satisfied:

$$R2(\theta 2) < R1(\theta 1) < R2(\theta 1)$$

$$\theta 1 = 90 - (\theta M - S(\beta 1))$$

$$\theta 2 = 90 - (\theta M - S(\beta 2))$$

-continued $$S(\theta) = \sin\hat{}(-1)(\sin(\theta)/n)$$

$$\beta 1 > \beta 2$$

where β1 is an incident angle [°] of light incident from the first separation surface to a predetermined position in an eyebox, β2 is an incident angle [°] of the light incident from the second separation surface to the predetermined position, θM is an angle [°] between the first separation surface or the second separation surface and a surface normal of the light guide plate, n is a refractive index of the light guide plate for light with a predetermined wavelength included in a band of the image light, R1(θ) is a reflectance of the light with the predetermined wavelength incident on the first separation surface at an incident angle θ[°], and R2(θ) is a reflectance of the light with the predetermined wavelength incident on the second separation surface at the incident angle θ[°].

Further features of various embodiments of the disclosure will become apparent from the following description of embodiments with reference to the attached drawings.

DESCRIPTION OF THE EMBODIMENTS

Figure 1:
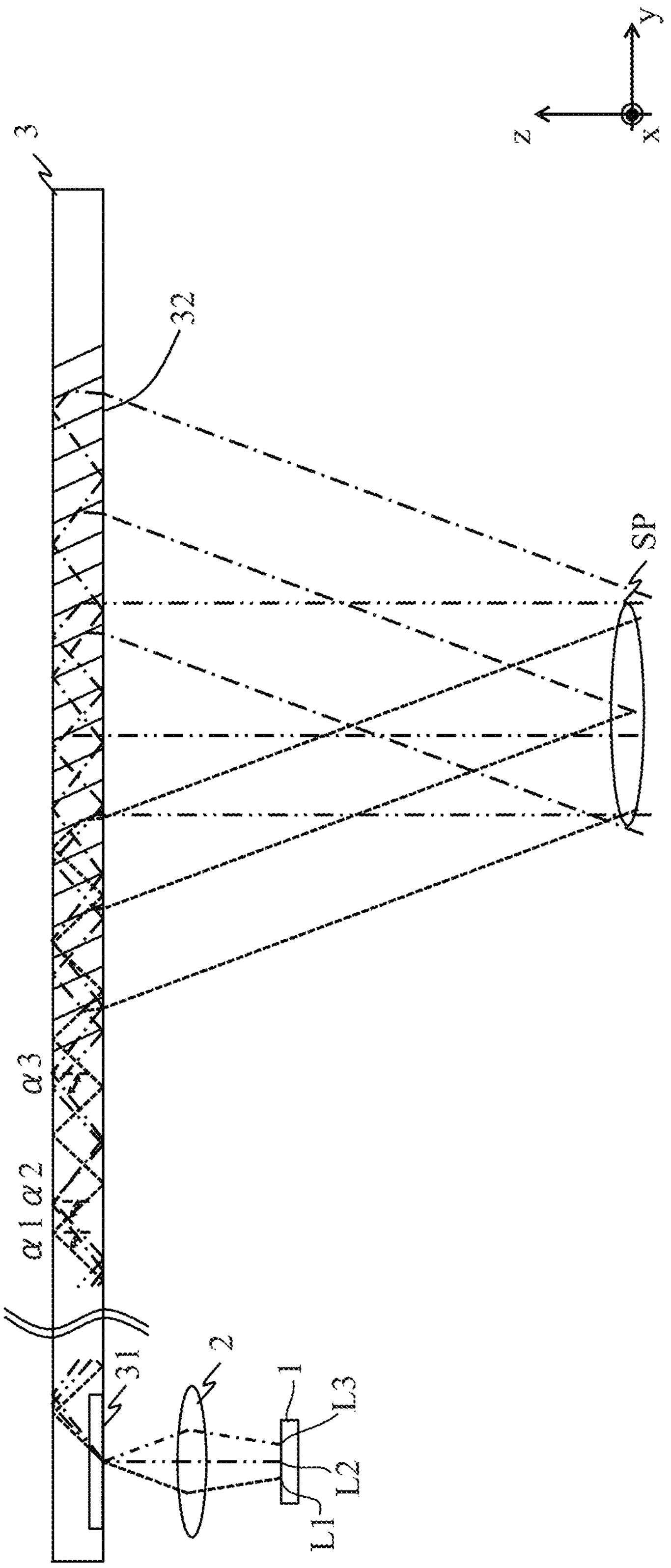
FIG. 1 is a conceptual diagram of an incident angle and effective diameter of light on separation surfaces in an image display apparatus according to one embodiment of the present disclosure.

Referring now to the accompanying drawings, a detailed description will be given of embodiments according to the disclosure. Corresponding elements in respective figures will be designated by the same reference numerals, and a duplicate description thereof will be omitted.

FIG. 1 is a conceptual diagram of an incident angle and effective diameter of light on separation surfaces in an image display apparatus according to an embodiment of the present disclosure. The image display apparatus includes an image display element (image generating element) 1 configured to emit image light (image display light), a projection optical system 2, and a light guide plate 3 having an entrance portion 31 where the image light enters, and an exit portion 32 where the image light exits. For example, a combination of a liquid crystal panel and an illumination optical system may be used as the image display element 1. A self-luminous display in which a light source (OLED or LED) is disposed for each pixel, or a combination of a Micro Electro Mechanical Systems (MEMS) and a laser light source may be used as the image display element 1. The projection optical system 2 includes optical elements such as a lens, a diffractive optical element, a holographic element, or a metasurface.

Light beams L1, L2, and L3 emitted from the pixels of the image display element 1 enter the projection optical system 2, enter the entrance portion 31 at different angles, are deflected, and then propagate through the light guide plate 3 at different total reflection angles $\alpha 1$, $\alpha 2$, and $\alpha 3$ ($\alpha 1<\alpha 2<\alpha 3$). A portion of the light beams that enter the exit portion 32 are deflected toward the observer's pupil SP, while other light beams propagate through the light guide plate 3 by total reflections and enter the exit portion 32.

In this embodiment, the exit portion 32 has a plurality of separation surfaces. Each separation surface is configured to separate incident light into reflected light and transmitting light. This embodiment properly sets the angle characteristics of the reflectances of the plurality of separation surfaces so as to reflect the light of the angle component that enters the observer's pupil SP and transmit the light of the other angle components, thereby achieving high light utilization efficiency.

The wavelength range and polarization component of the image light emitted from the image display element 1 may be properly set according to the configurations of the entrance portion 31, the extension portion, and the exit portion 32. For example, the image display element may be configured to emit monochromatic light using only a green laser light source.

Figure 2:
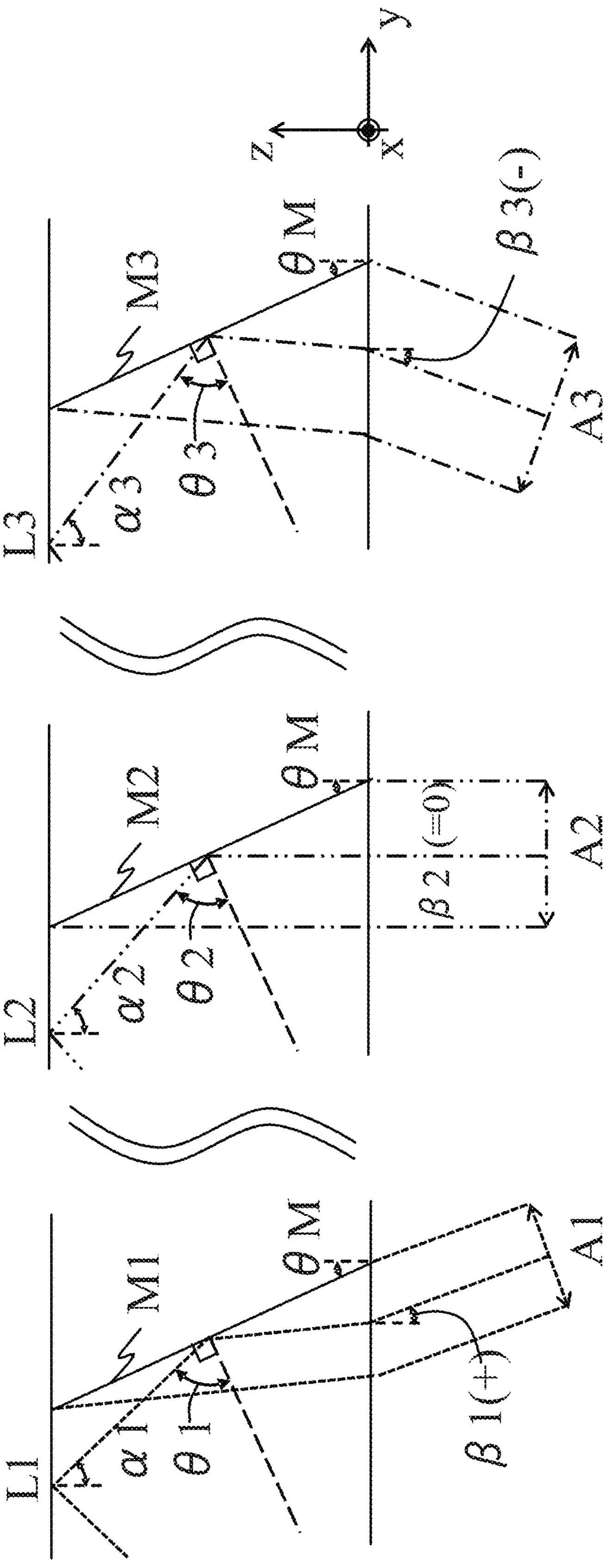
FIG. 2 is a conceptual diagram of a light beam propagating inside a light guide plate in this embodiment.

A description will now be given of the angular characteristics of the reflectance of a plurality of separation surfaces. FIG. 2 is a conceptual diagram of a light beam propagating inside the light guide plate 3 according to this embodiment. Separation surfaces M1, M2, and M3 are provided in this order from the-y side (the side closer to the entrance portion 31) to the +y side (the side farther from the entrance portion 31). In order to extract light that enters the observer's pupil SP, the corresponding separation surfaces are to reflect light beams with different total reflection angles. The light beams with the corresponding total reflection angles of separation surfaces M1, M2, and M3 will be referred to as light L1, L2, and L3, respectively. The incident angles $\alpha 1$, $\alpha 2$, and $\alpha 3$ of the angle components of light that enter the observer's pupil SP on separation surfaces M1, M2, and M3 have the following relationship.

$$\theta 1 > \theta 2 > \theta 3$$

Therefore, in the separation surface on the −y side, the reflectance corresponding to a large incident angle in the incident angle range in the optical path deflected to the observer's pupil SP is increased, and the reflectance corresponding to a small incident angle is decreased. In the separation surface on the +y side, the reflectance corresponding to a small incident angle in the incident angle range in the optical path deflected to the observer's pupil SP is increased. This configuration can achieve high light utilization efficiency.

A description will now be given of a relationship between the reflectances of the separation surfaces and a relationship between the intra-separation-surface reflectances. In FIG. 2, the optical effective diameters A1, A2, and A3 of the separation surfaces M1, M2, and M3 have the following relationship.

$$A1 < A2 < A3$$

By setting the angular characteristics of the reflectance to correct the relationship between the optical effective diameters of the separation surfaces, the light beams emitted from each separation surface at different exit angles become uniform. That is, the reflectance for the corresponding light may be set high for separation surfaces with small optical effective diameters, and the reflectance for the corresponding light may be set low for separation surfaces with large optical effective diameters. The reflectances $R1(\theta)$, $R2(\theta)$, and $R3(\theta)$ for the incident light (light of a predetermined wavelength included in the image light band of the light guide plate 3) incident at an incident angle $\theta$ on each of the separation surfaces M1, M2, and M3 satisfy the following inequality (1):

$$R1(\theta 1) > R2(\theta 2) > R3(\theta 3) \quad (1)$$

The reflectance of the separation surface on the −y side (the side closer to the entrance portion 31) for light at a predetermined incident angle in the incident angle range in the optical path deflected to the observer's pupil SP is reduced, and the reflectance of the separation surface on the +y side (the side farther from the entrance portion 31) is increased. Thereby, the light beams of the same exit angle reflected by the plurality of separation surfaces become uniform. Since the light beam is reflected by the separation surface on the −y side, in order to obtain a similar light beam on the separation surface on the +y side, the reflectance is to be relatively high. Therefore, the reflectances $R1(\theta 1)$, $R2(\theta 1)$, and $R3(\theta 1)$ for the incident light beams incident on each of the separation surfaces M1, M2, and M3 at an incident angle θ1 satisfy the following inequality (2):

$$R1(\theta 1) < R2(\theta 1) < R3(\theta 1) \quad (2)$$

From inequalities (1) and (2), the reflectances of the separation surfaces M1 and M2 satisfy the following inequality (3):

$$R2(\theta 2) < R1(\theta 1) < R2(\theta 1) \quad (3)$$

The plurality of separation surfaces that satisfy inequality (3) can realize an image display apparatus with uniform luminance over an angle-of-field range incident on the observer's pupil SP with high light utilization efficiency.

Figure 3:
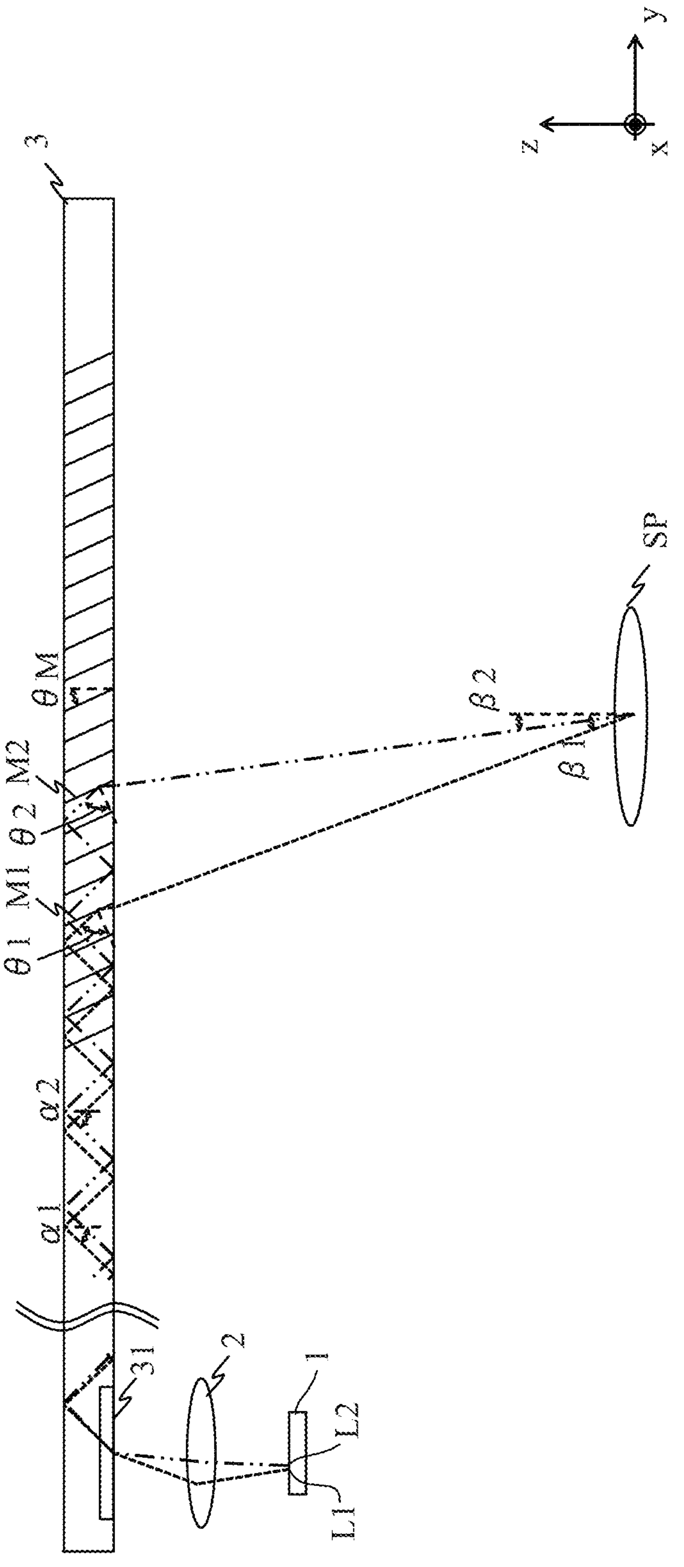
FIG. 3 is a conceptual diagram of a position of separation surfaces viewed from a predetermined position of an observer's pupil and an incident angle of light in this embodiment.

FIG. 3 is a conceptual diagram of the positions of separation surfaces M1 and M2 viewed from a predetermined position on the observer's pupil SP in this embodiment, and the incident angle of light. The incident angles θ1[°] and θ2[°] of light incident on the separation surfaces M1 and M2 from the separation surfaces M1 and M2 at a predetermined position on the observer's pupil SP are expressed using the following equations:

$$\theta 1 = 90 - (\theta M - S(\beta 1))$$

$$\theta 2 = 90 - (\theta M - S(\beta 2))$$

$$S(\theta) = \sin\hat{}(-1)(\sin(\theta)/n)$$

Here, β1 is an incident angle [°] of light incident on a predetermined position on the observer's pupil SP from the separation surface M1. β2 is an incident angle [°] of light incident on a predetermined position on the observer's pupil SP from the separation surface M2. The incident angle β1 is larger than the incident angle β2. θM is an angle [°] between each separation surface and the surface normal of the light guide plate 3. n is a refractive index for light of a predetermined wavelength included in the image light band of the light guide plate 3. S(θ) indicates refraction according to Snell's law.

Figure 4A:
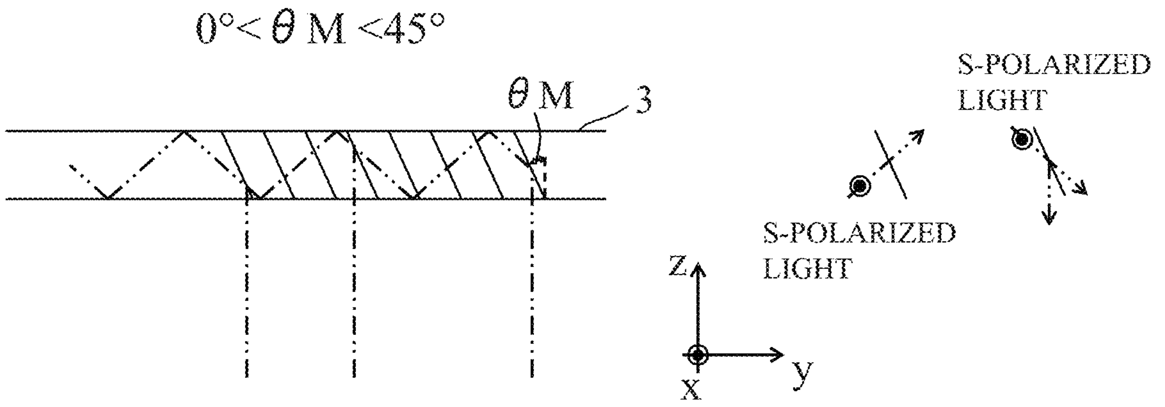
FIGS. 4A and 4B are schematic diagrams of a plurality of separation surfaces in this embodiment.
Figure 4B:
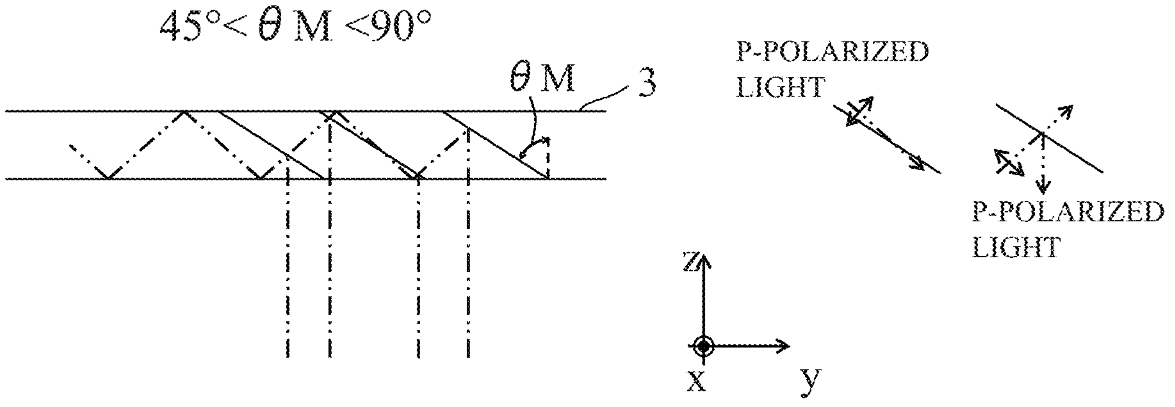

FIGS. 4A and 4B are schematic diagrams of the plurality of separation surfaces according to this embodiment. FIG. 4A illustrates that the angle θM between each separation surface and the surface normal of the light guide plate 3 is larger than 0° and smaller than 45°. In this case, each separation surface transmits light in a relatively normal incident angle range and reflects light in a relatively oblique incident angle range, thereby deflecting the light to the observer's pupil SP. The incident angle characteristic of the reflectance at this time is obtained by using a dielectric multilayer film for each separation surface. More specifically, each separation surface includes a dielectric multilayer film that transmits P-polarized light and has the above incident angle characteristic for S-polarized light. In the relatively oblique incident angle range of S-polarized light, satisfying inequality (3) can achieve uniform luminance over the angle-of-field range where the light is incident on the observer's pupil SP with high utilization efficiency.

In the case of FIG. 4A, the following inequality (4) may be satisfied:

$$1.0 < R1(\theta 1)/R2(\theta 2) < 5.0 \quad (4)$$

Inequality (4) defines the reflectances for correcting the relationship between the optical effective diameters of the separation surfaces. In a case where the value becomes higher than the upper limit, the reflectance becomes overcorrected for the relationship between the optical effective diameters of the separation surfaces, and the light beams with different exit angles extracted from respective separation surfaces become nonuniform.

Inequality (4) may be replaced with inequality (4a) below:

$$1.0 < R1(\theta 1)/R2(\theta 2) < 4.0 \quad (4a)$$

Inequality (4) may be replaced with inequality (4b) below:

$$1.0 < R1(\theta 1)/R2(\theta 2) < 3.0 \quad (4b)$$

In this embodiment, the following inequality (5) may be satisfied:

$$90 - \theta\mathrm{M} - 5 \le \kappa \le 90 - \theta\mathrm{M} + 5 \quad (5)$$

Inequality (5) may be replaced with inequality (5a) below:

$$85 - \theta M \le \kappa \le 95 - \theta M \quad (5a)$$

where κ is the Brewster condition for the dielectric multilayer film of each separation surface, and is expressed by the following equation:

$$k = \sin^{-1}\sqrt{\frac{n_H^2 n_L^2}{n^2(n_H^2 + n_L^2)}}$$

Here, $n_H$ is a refractive index of a high refractive index film constituting the dielectric multilayer film for light with a predetermined wavelength included in the image light band. $n_L$ is a refractive index of a low refractive index film constituting the dielectric multilayer film for the light with the predetermined wavelength included in the image light band. The light with a predetermined wavelength included in the image light band is, for example, light with a dominant wavelength. The dominant wavelength is, for example, a peak wavelength of the image light band.

The angular ranges on the left and right sides of inequality (5) are the relatively oblique incident angle ranges. Satisfying inequality (5) can realize a configuration that transmits P-polarized light.

FIG. 4B illustrates that the angle θM between each separation surface and the surface normal of the light guide plate 3 is larger than 45° and smaller than 90°. In this case, each separation surface reflects light in a relatively normal incident angle range and transmits light in a relatively oblique incident angle range, so that the light can be deflected to the observer's pupil SP. The incident angle characteristic of the reflectance in this case is obtained by using a dielectric multilayer film for each separation surface. More specifically, each separation surface is configured using a dielectric multilayer film that transmits S-polarized light and has the above incident angle characteristic for P-polarized light. In the relatively oblique incident angle range of P-polarized light, each separation surface satisfies inequality (5), and achieves uniform luminance in the angle-of-field angle range incident on the observer's pupil SP with high utilization efficiency.

In the case of FIG. 4B, the following inequality (6) may be satisfied:

$$1.0 < R1(\theta 1)/R2(\theta 2) < 4.0 \tag{6}$$

Inequality (6) defines the reflectance for correcting a relationship between the optical effective diameters of the separation surfaces. In a case where the value becomes higher than the upper limit of inequality (6), the reflectance is overcorrected for the relationship between the optical effective diameters of the separation surfaces, and the light beams with different exit angles extracted from the separation surfaces are not uniform.

Inequality (6) may be replaced with inequality (6a) below:

$$1.0 < R1(\theta 1)/R2(\theta 2) < 3.0 \tag{6a}$$

Inequality (6) may be replaced with inequality (6b) below:

$$1.0 < R1(\theta 1)/R2(\theta 2) < 2.0 \tag{6b}$$

Figure 5A:
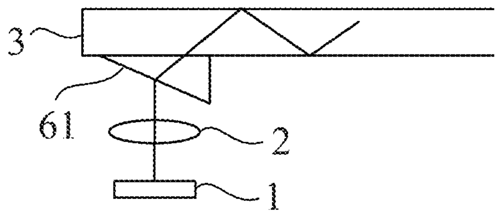
FIGS. 5A, 5B, and 5C illustrate configuration examples of an entrance portion.
Figure 5B:
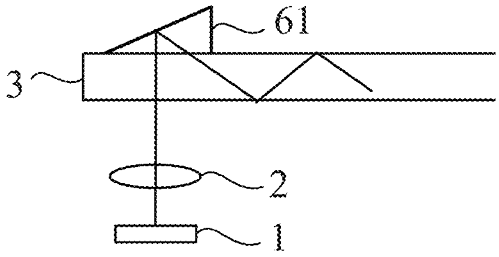
Figure 5C:
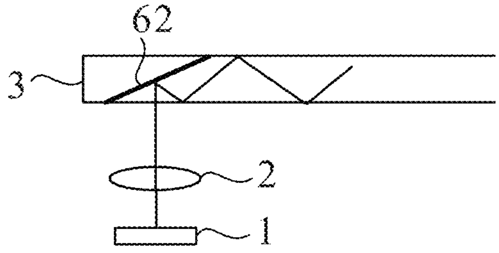
Figure 6A:
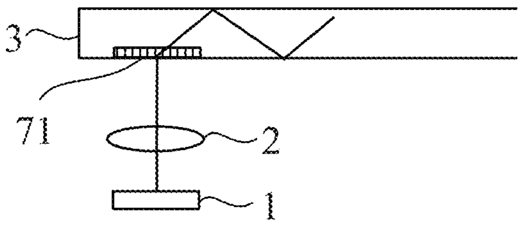
FIGS. 6A, 6B, 6C, 6D, and 6E illustrate other configuration examples of the entrance portion.
Figure 6B:
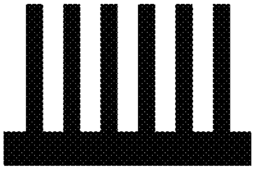
Figure 6C:
Figure 6D:
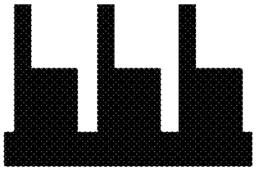
Figure 6E:
Figure 7A:
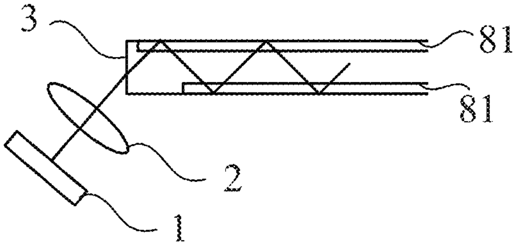
FIGS. 7A and 7B illustrate other configuration examples of the entrance portion.
Figure 7B:
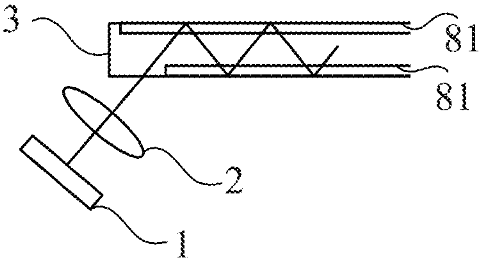

A description will now be given of a configuration example of the entrance portion 31. FIGS. 5A to 7B illustrate configuration examples of the entrance portion 31. The entrance portion 31 may use a prism element 61 as illustrated in FIGS. 5A and 5B, or a reflective surface 62 as illustrated in FIG. 5C. As illustrated in FIG. 6A, the entrance portion 31 may use a diffractive optical element 71. The efficiency and diffraction angle for each diffraction order can be controlled by changing the shape and height of the grating structure of the diffractive optical element 71, as well as the refractive index, as illustrated in FIGS. 6B, 6C, 6D, and 6E, and may be determined according to the requirements of the image display apparatus. The entrance portion 31 may use a holographic element. As illustrated in FIGS. 7A and 7B, the entrance portion 31 may be configured to make a light beam from the projection optical system 2 enter the light guide plate 3 at an oblique angle relative to the normal to the incident surface of the light guide plate 3, and to guide the light into the light guide plate 3 by reflective surfaces 81.

A specific configuration according to each example will be described below. In each example, the image display apparatus emits three colors of light, RGB. In each example, the dominant wavelength of the red light (R light) from the image display element 1 is 640 nm, the dominant wavelength of the green light (G light) is 520 nm, and the dominant wavelength of the blue light (B light) is 450 nm.

Figure 8:
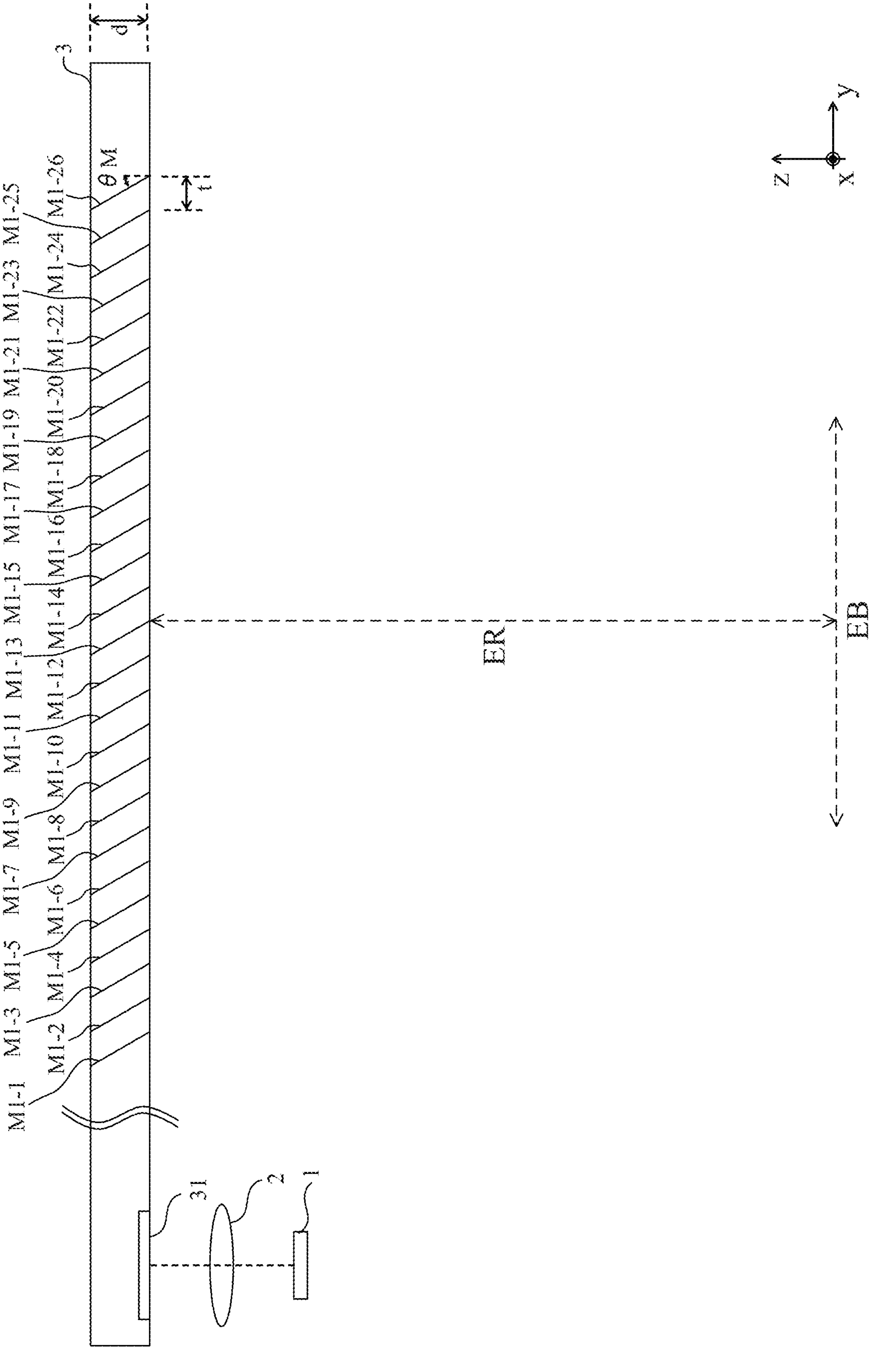
FIG. 8 illustrates the configuration of an image display apparatus according to Example 1.

FIG. 8 is a configuration diagram of an image display apparatus according to Example 1. The image display apparatus according to Example 1 includes an image display element 1, a projection optical system 2, and a light guide plate 3. The light guide plate 3 includes an entrance portion 31, and an exit portion 32 having 26 separation surface M1. The separation surface MI includes a dielectric multilayer film. An angle θM between the separation surface M1 and the surface normal of the light guide plate 3 is 30°, a distance t between the separation surfaces M1 is 1.00 [mm], a refractive index n of the light guide plate 3 is 1.518, and a thickness d of the light guide plate 3 is 1.73 [mm]. An angle-of-field range Δβ incident on the observer's pupil SP is 38.6°, a distance (eye relief) ER between the light guide plate 3 and an area which light of the entire angle-of-field range Δβ enters is 20.0 [mm], and a size of this area EB (eyebox) is 12.0 [mm].

Figure 9A:
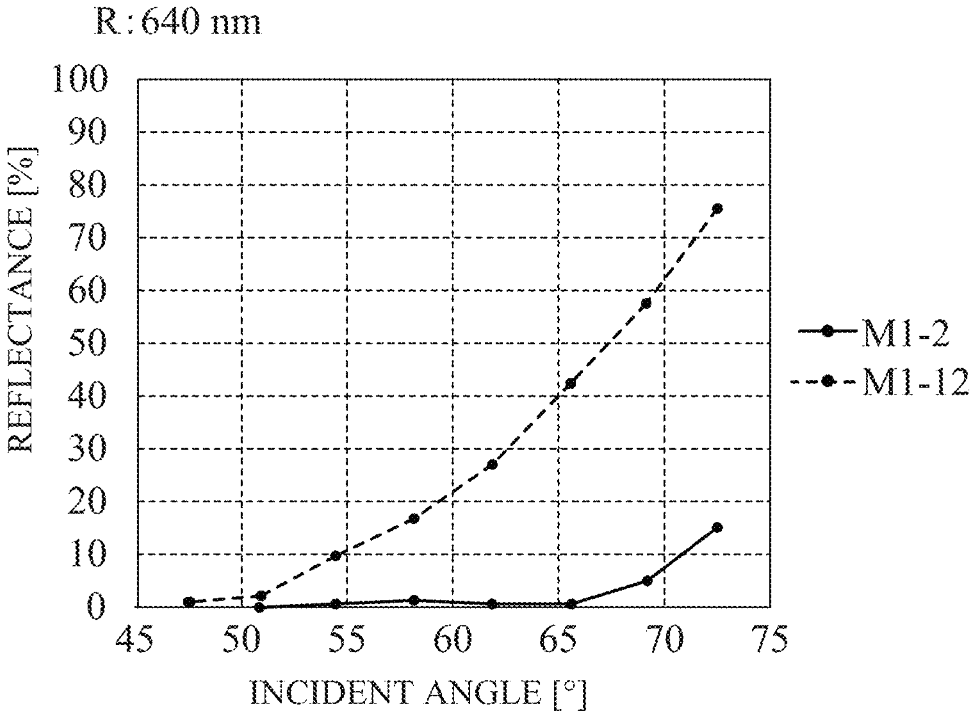
FIGS. 9A, 9B, and 9C illustrate the angular characteristic of the reflectance of a dielectric multilayer film according to Example 1 for S-polarized light.
Figure 9B:
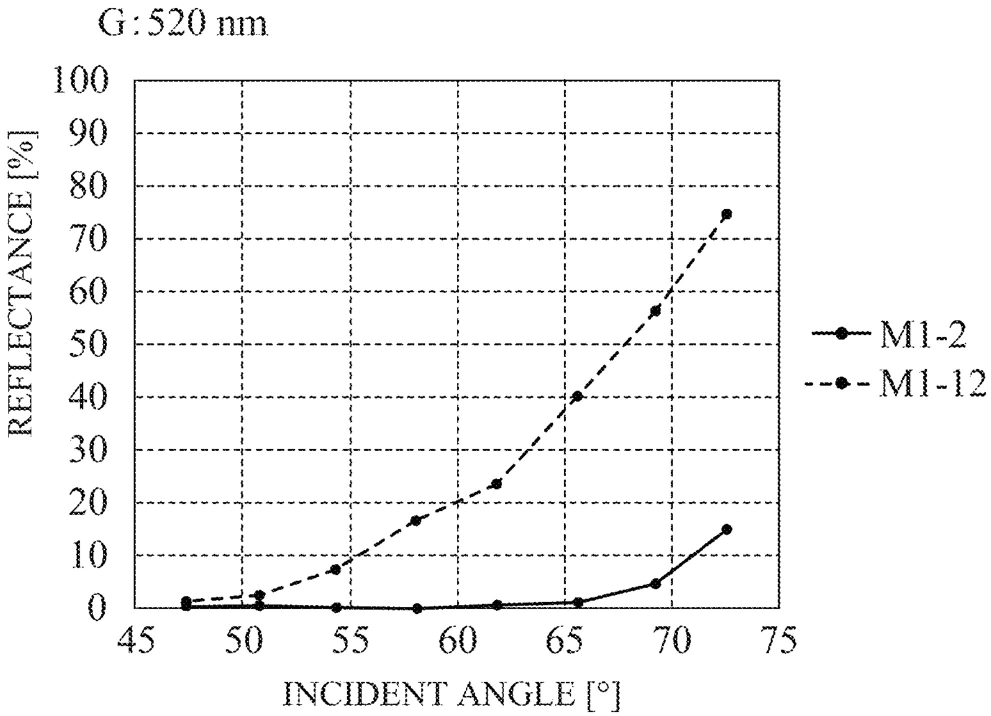
Figure 9C:
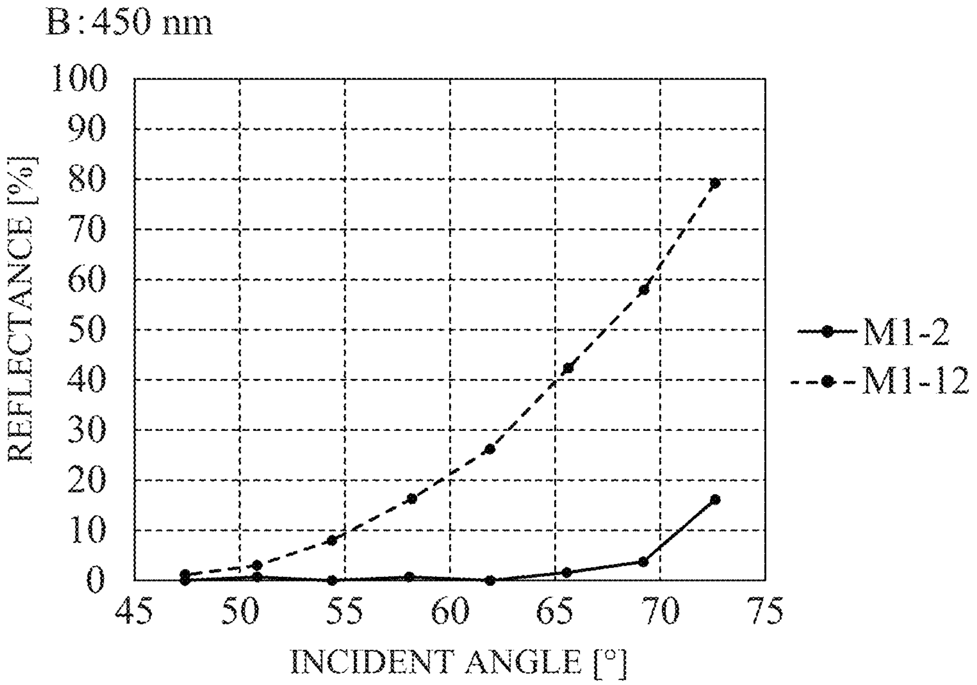

A film configuration of the dielectric multilayer film of separation surfaces M1-2 and M1-12 is illustrated as numerical example 1. FIGS. 9A, 9B, and 9C illustrate the angular characteristic of the reflectance for S-polarized light of the dielectric multilayer film of the separation surfaces M1-2 and M1-12 at the dominant wavelengths of RGB light in Example 1. In a case where a position y=−4.5 [mm] of the observer's pupil SP is considered, the light from the separation surface M1-2 is incident at an incident angle β of 19.8°, and the light from the separation surface M1-12 is incident at an incident angle β of −8.5°. Reflectances R1-2 (72.6°), R1-12 (54.4°), and R1-12 (72.6°) for light with the dominant wavelength of the G light at the corresponding incident angles of the separation surfaces M1-2 and M1-12 are 14.8%, 7.4%, and 74.8%, respectively. A value R1-2 (72.6°)/R1-12 (54.4°) is 2.00. By setting the angular characteristic of the reflectance in this way to correct the relationship between the optical effective diameters of the separation surfaces, the light beams reflected on the respective separation surfaces at different exit angles become uniform, and uniform luminance can be realized.

Figure 10:
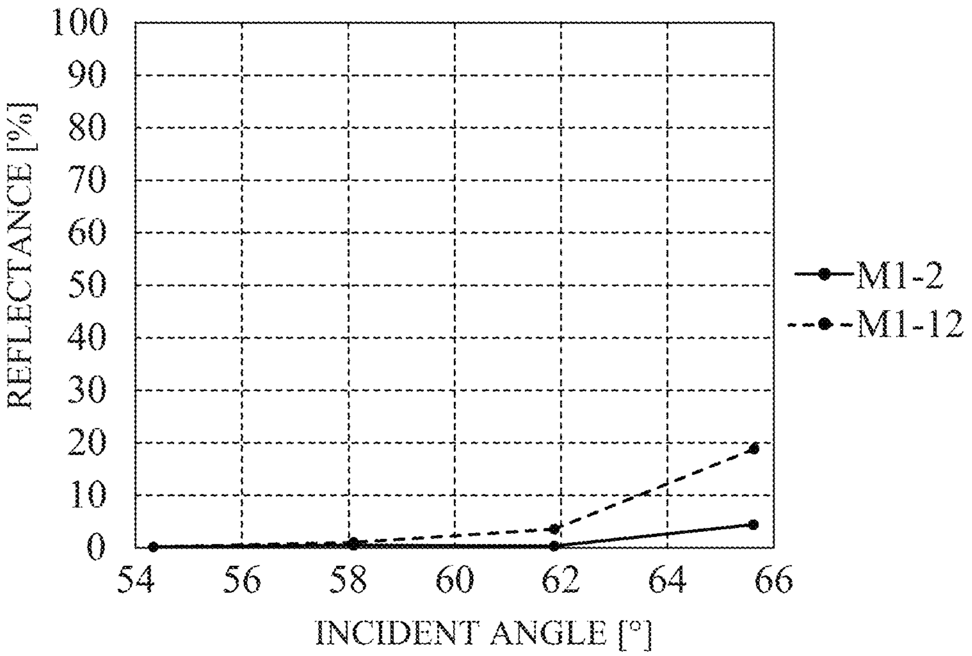
FIG. 10 illustrates the angular characteristic of the reflectance of the dielectric multilayer film according to Example 1 for P-polarized light.

FIG. 10 illustrates the angular characteristic of the reflectance of P-polarized light for the dielectric multilayer film of the separation surfaces M1-2 and M1-12 at the dominant wavelength of the G light in Example 1. The refractive index $n_H$ of the high refractive index film, the refractive index $n_L$ of the low refractive index film, and the refractive index n of the light guide plate 3 at the dominant wavelength of the G light, which constitute the dielectric multilayer film of the separation surface M1 are 2.402, 1.457, and 1.518, respectively. The Brewster condition κ is 55.1°. Since the dielectric film is configured to satisfy the Brewster condition κ, the reflectance is reduced in an incident angle range of 55° to 65°.

Figure 11:
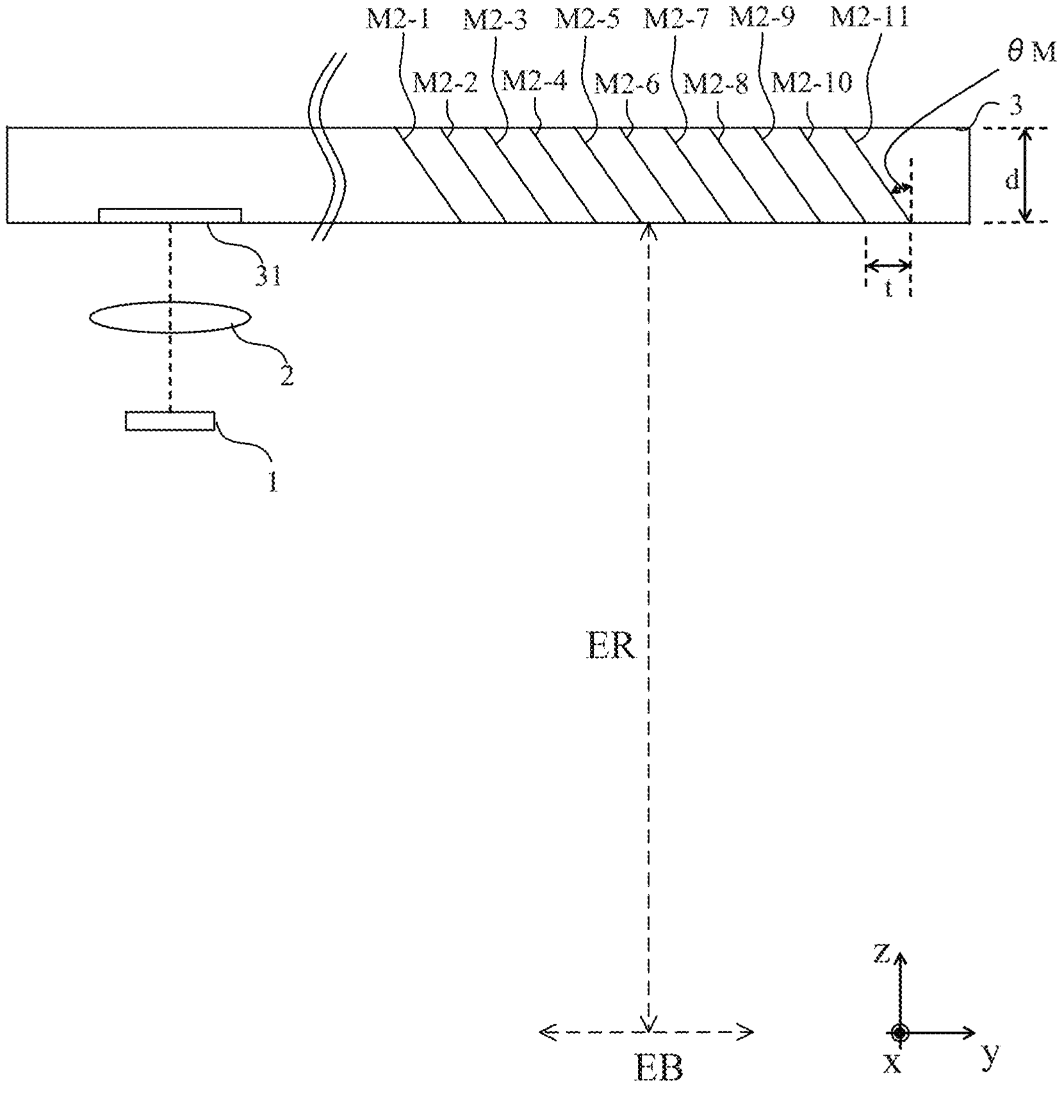
FIG. 11 is a configuration diagram of an image display apparatus according to Example 2.

FIG. 11 is a configuration diagram of an image display apparatus according to Example 2. The image display apparatus according to Example 2 includes an image display element 1, a projection optical system 2, and a light guide plate 3. The light guide plate 3 includes an entrance portion 31, and an exit portion 32 having 11 separation surfaces M2. The separation surface M2 includes a dielectric multilayer film. An angle θM between the separation surface M2 and the surface normal of light guide plate 3 is 25°, a distance t between the separation surfaces M2 is 1.00 [mm], a refractive index n of light guide plate 3 is 1.518, and a thickness d of light guide plate 3 is 2.14 [mm]. An angle-of-field range Δβ incident on the observer's pupil SP is 18.0°, a distance ER between the light guide plate 3 and an area which light of the entire angle-of-field range Δβ enters is 18.0 [mm], and a size EB of this area is 5.0 [mm].

Figure 12A:
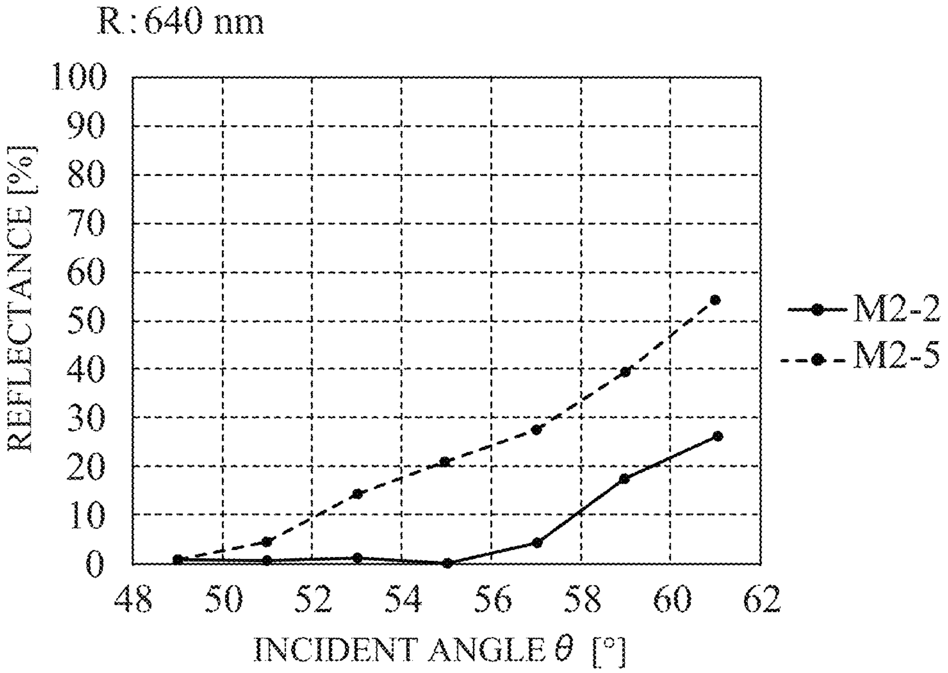
FIGS. 12A, 12B, and 12C illustrate the angular characteristic of the reflectance of the dielectric multilayer film according to Example 2 for S-polarized light.
Figure 12B:
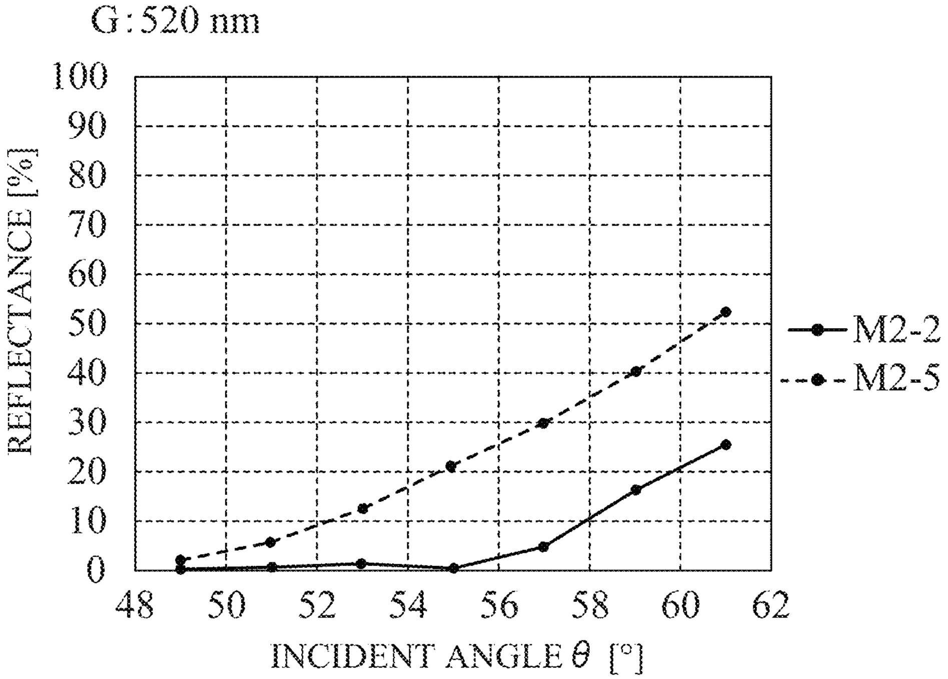
Figure 12C:
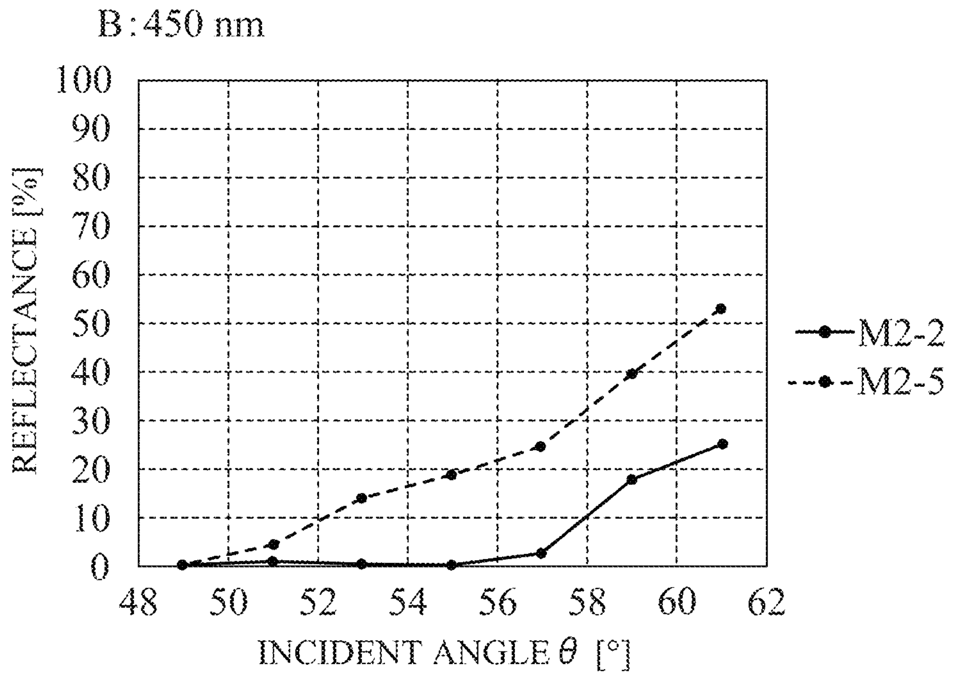

A film configuration of the dielectric multilayer film of separation surfaces M2-2 and M2-5 is illustrated as numerical example 2. FIGS. 12A, 12B, and 12C illustrate the angular characteristic of the reflectance for S-polarized light of the dielectric multilayer film of the separation surfaces M2-2 and M2-5 at the dominant wavelengths of RGB light in Example 2. In a case where a position y=−1.0 [mm] of the observer's pupil SP is considered, the light from the separation surface M2-2 is incident at an incident angle β of 9.0°, and the light from the separation surface M2-5 is incident at an incident angle β of 0.0°. Reflectances R2-2 (61.0°), R2-5 (55.0°), and R2-5 (61.0°) for light with the dominant wavelength of the G light at the corresponding incident angles of the separation surfaces M2-2 and M2-5 are 25.5[%], 21.2 [%], and 52.4[%], respectively. A value R2-2 (61.0°)/R2-5 (49.0°) is 1.21. By setting the angular characteristic of the reflectance in this way to correct the relationship between the optical effective diameters of the separation surfaces, the light beams reflected on the respective separation surfaces at different exit angles become uniform, and uniform luminance can be realized.

Figure 13:
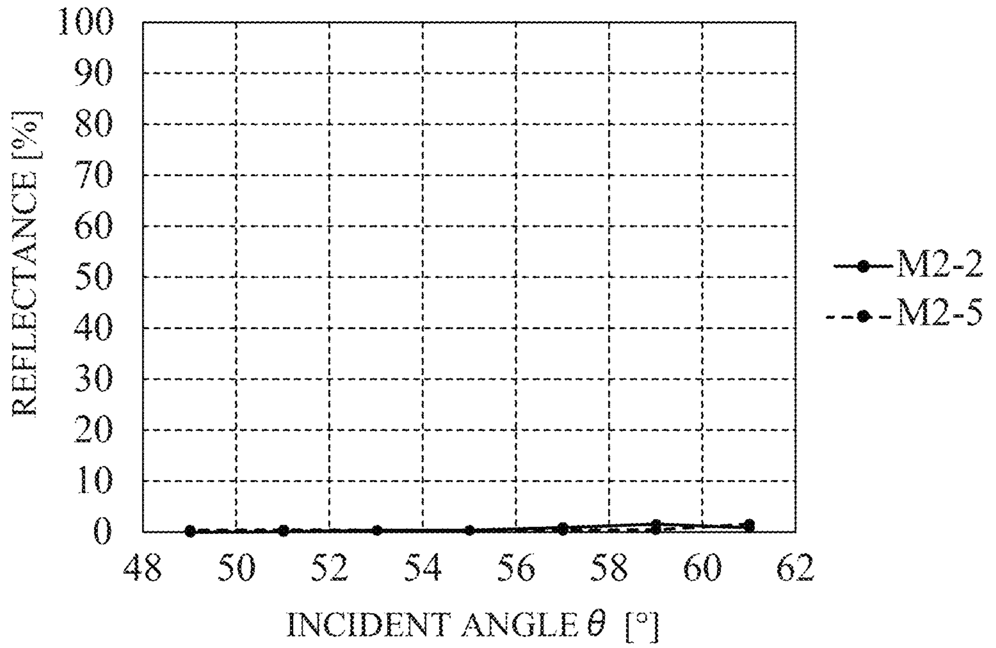
FIG. 13 illustrates the angular characteristic of the reflectance of the dielectric multilayer film according to Example 2 for P-polarized light.

FIG. 13 illustrates the angular characteristic of the reflectance of P-polarized light for the dielectric multilayer film of the separation surfaces M2-2 and M2-5 at the dominant wavelength of the G light in Example 2. The refractive index $n_H$ of the high refractive index film, the refractive index $n_L$ of the low refractive index film, and the refractive index n of the light guide plate 3 at the dominant wavelength of the G light, which constitute the dielectric multilayer film of the separation surfaces M2 are 2.402, 1.457, and 1.518, respectively. The Brewster condition κ is 55.1°. Since the dielectric film is configured to satisfy the Brewster condition κ, the reflectance is reduced in an incident angle range of 50° to 60°.

Figure 14:
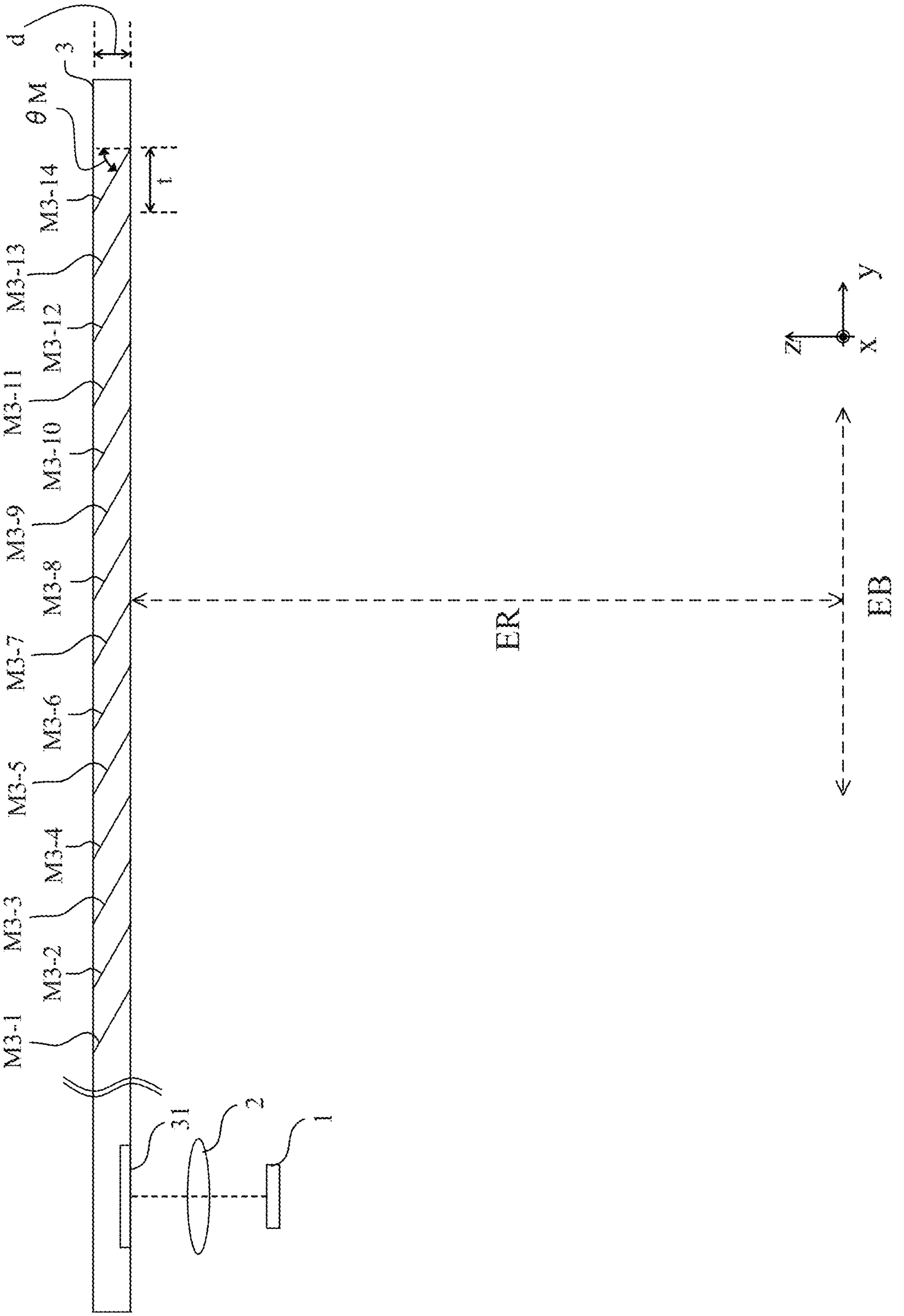
FIG. 14 is a configuration diagram of an image display apparatus according to Example 3.

FIG. 14 illustrates the configuration of an image display apparatus according to Example 3. The image display apparatus according to Example 3 includes an image display element 1, a projection optical system 2, and a light guide plate 3. The light guide plate 3 includes an entrance portion 31, and an exit portion 32 having 14 separation surfaces M3. The separation surface M3 includes a dielectric multilayer film. An angle θM between separation surface M3 and the surface normal of light guide plate 3 is 60°, a distance t between the separation surfaces M3 is 2.00 [mm], a refractive index n of light guide plate 3 is 1.516, and a thickness d of light guide plate 3 is 1.15 [mm]. An angle-of-field range Δβ incident on the observer's pupil SP is 40.0°, a distance ER between the light guide plate 3 and an area which light of the entire angle-of-field range Δβ enters is 22.0 [mm], and a size EB of the area is 12.0 [mm].

Figure 15A:
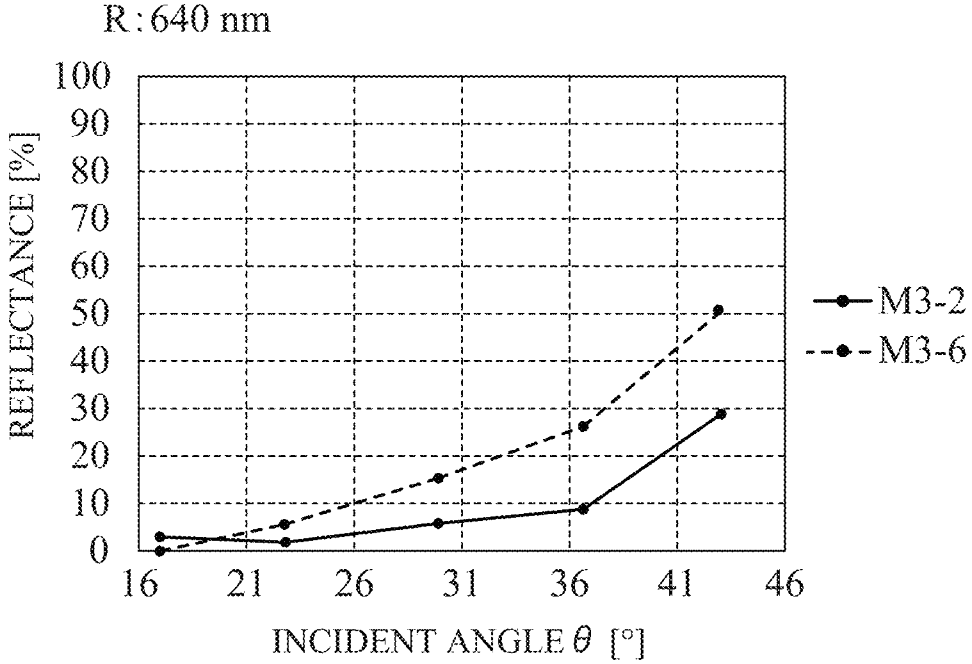
FIGS. 15A, 15B, and 15C illustrate the angular characteristic of the reflectance of the dielectric multilayer film according to Example 3 for S-polarized light.
Figure 15B:
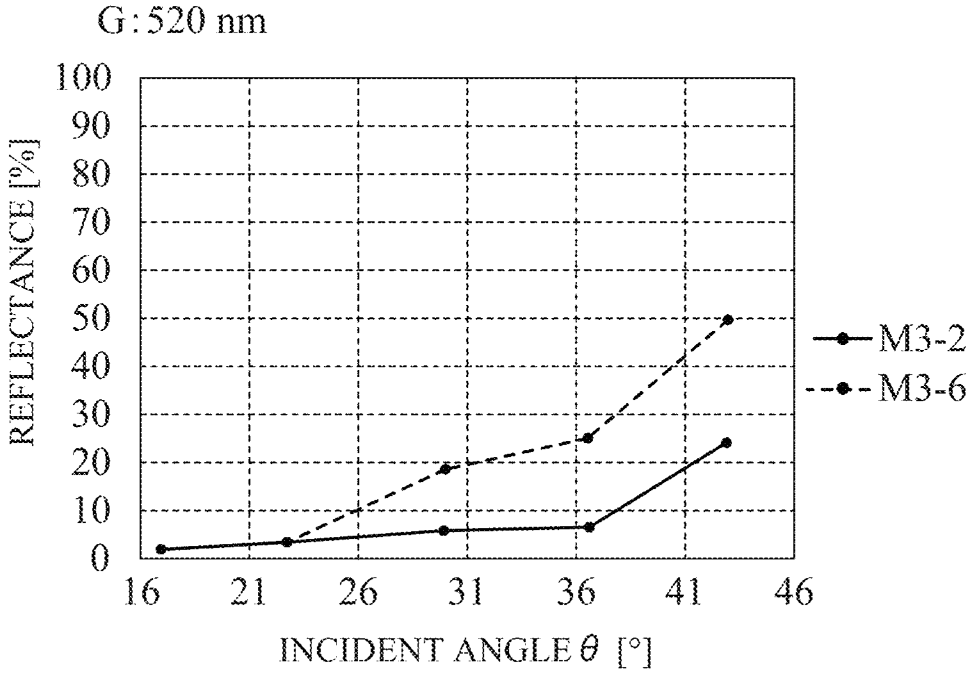
Figure 15C:
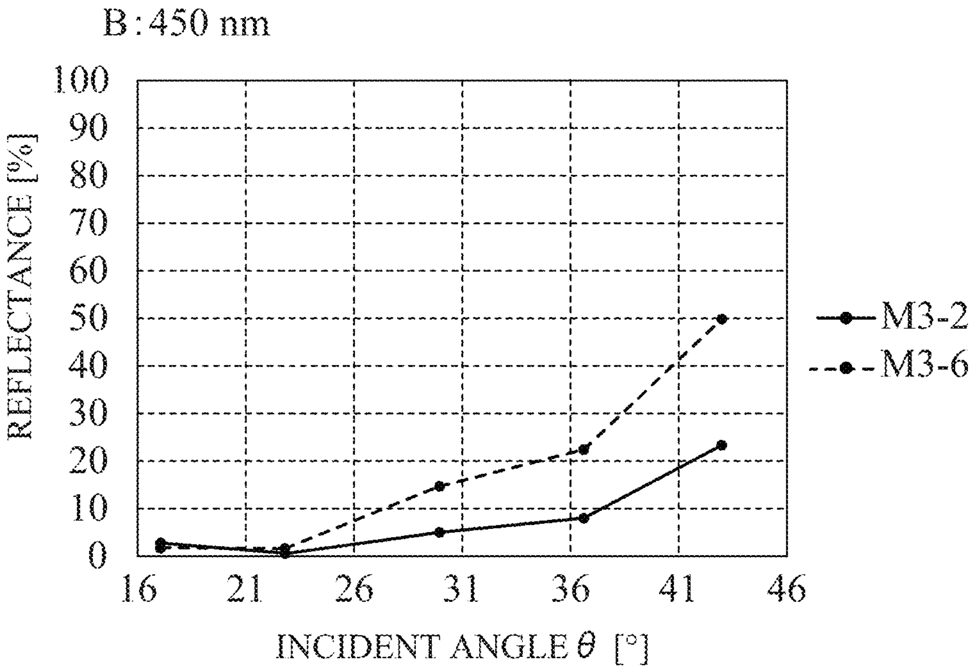

A film configuration of the dielectric multilayer film of separation surfaces M3-2 and M3-6 is illustrated as numerical example 3. FIGS. 15A, 15B, and 15C illustrate the angular characteristic of the reflectance for S-polarized light of the dielectric multilayer film of the separation surfaces M3-2 and M3-6 at the dominant wavelengths of RGB light in Example 3. In a case where a position y=−3.0 [mm] of the observer's pupil SP is considered, the light from separation surface M3-2 is incident at an incident angle β of 20.0°, and the light from separation surface M3-6 is incident at an incident angle β of 0.0°. Reflectances R3-2 (43.0°), R3-6 (30.0°), and R3-6 (43.0°) for light with the dominant wavelength of the G light at the corresponding incident angles of the separation surfaces M3-2 and M3-6 are 24.2[%], 18.6 [%], and 49.7[%], respectively. A value R3-2 (43.0°)/R3-10 (17.0°) is 1.30. By setting the angular characteristic of the reflectance in this way so as to correct the relationship between the optical effective diameters of the separation surfaces, the light beams reflected on the respective separation surfaces at different exit angles become uniform, and uniform luminance can be achieved.

Figure 16:
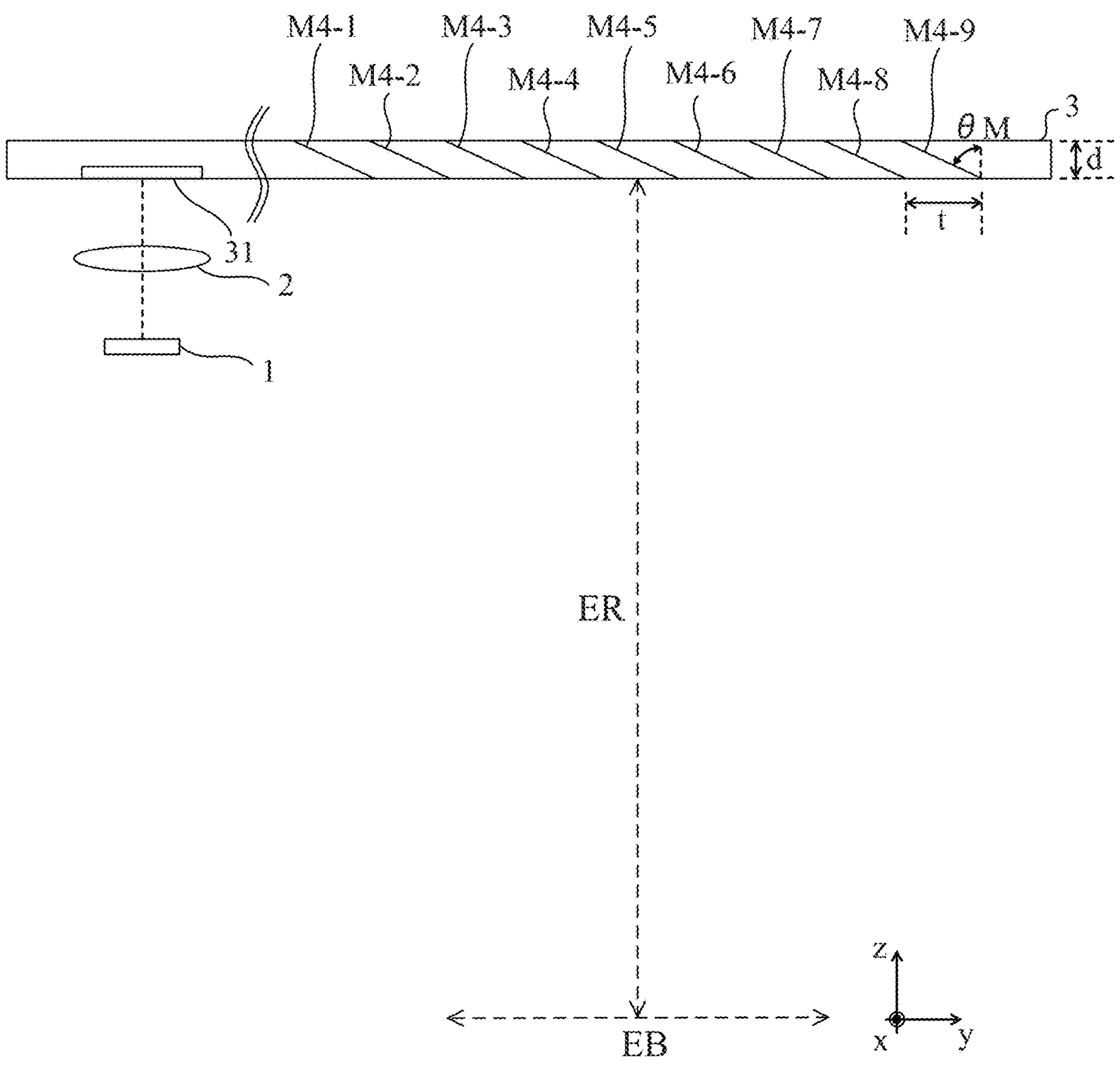
FIG. 16 is a configuration diagram of an image display apparatus according to Example 4.

FIG. 16 illustrates a configuration of an image display apparatus according to Example 4. The image display apparatus according to Example 4 includes an image display element 1, a projection optical system 2, and a light guide plate 3. The light guide plate 3 includes an entrance portion 31, and an exit portion 32 having 9 separation surfaces M4. The separation surface M4 includes a dielectric multilayer film. An angle θM between the separation surface M4 and the surface normal of the light guide plate 3 is 65°, a distance t of the separation surface M3 is 2.00 [mm], a refractive index n of the light guide plate 3 is 1.516, and a thickness d of the light guide plate 3 is 1.00 [mm]. An angle-of-field range Δβ incident on the observer's pupil SP is 20.0°, a distance ER between the light guide plate 3 and an area which light of the entire angle-of-field range Δβ enters is 22.0 [mm], and a size EB of the area is 10.0 [mm].

Figure 17A:
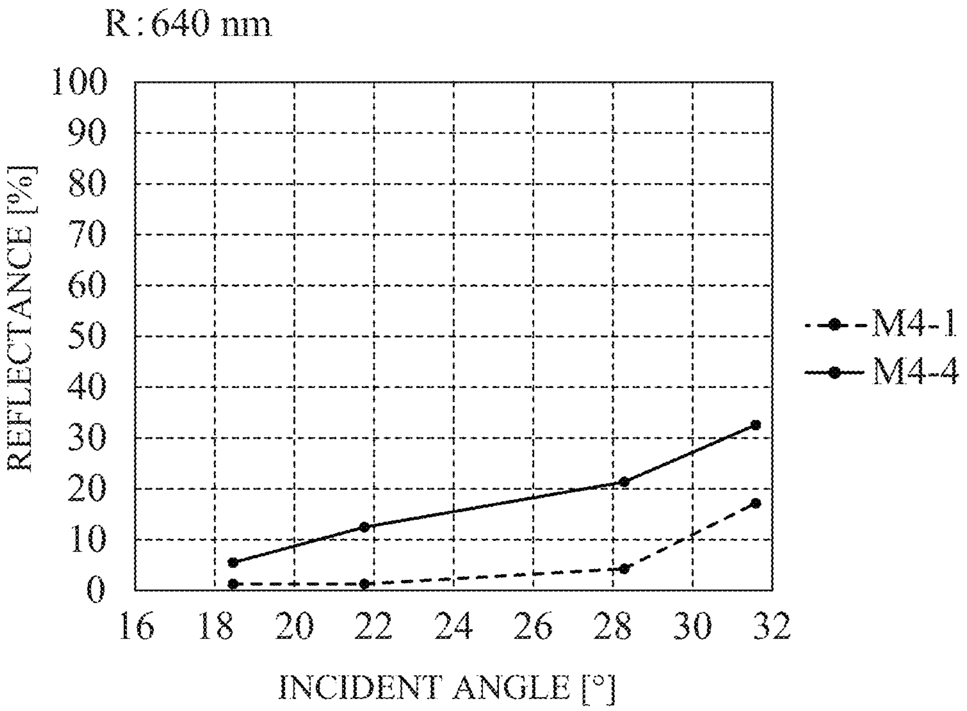
FIGS. 17A, 17B, and 17C illustrate the angular characteristic of the reflectance of the dielectric multilayer film according to Example 4 for S-polarized light.
Figure 17B:
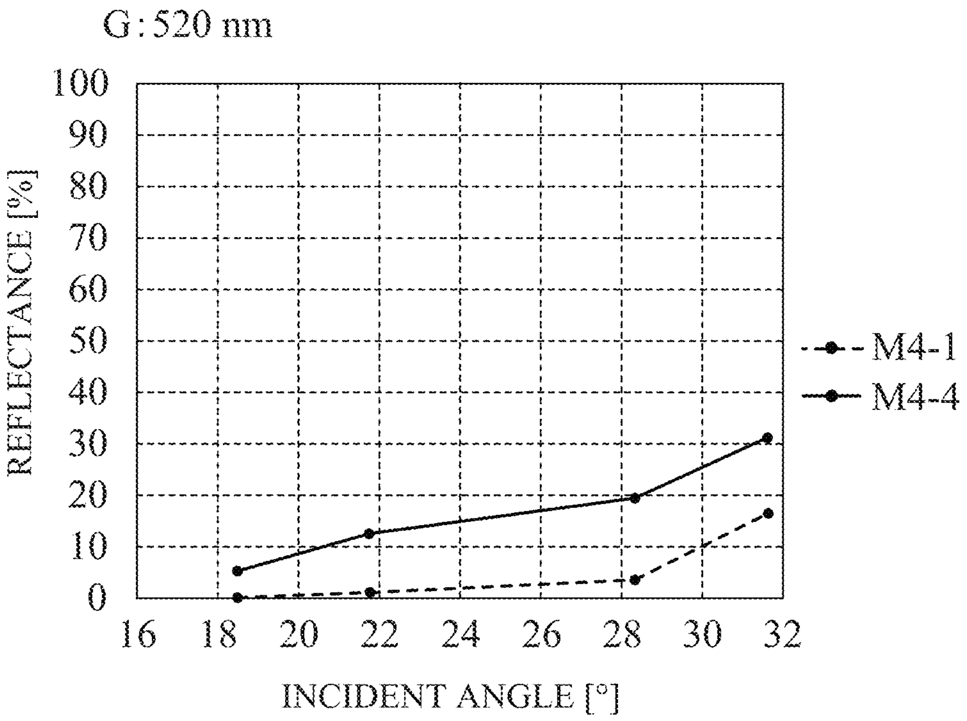
Figure 17C:
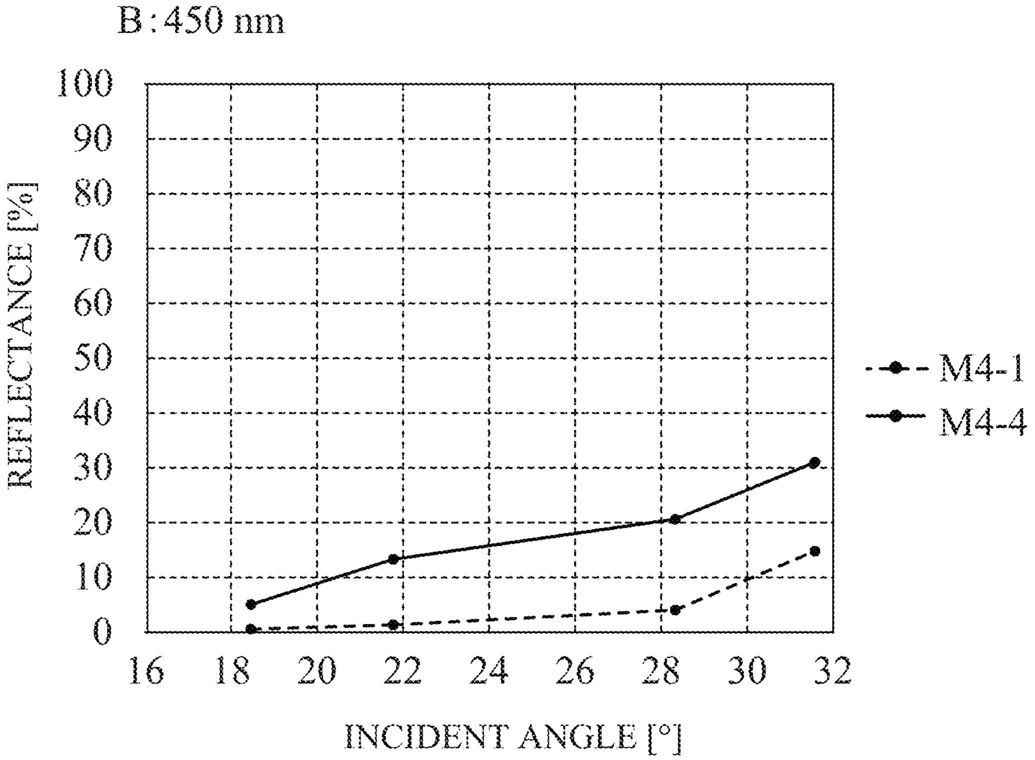
Figure 18:
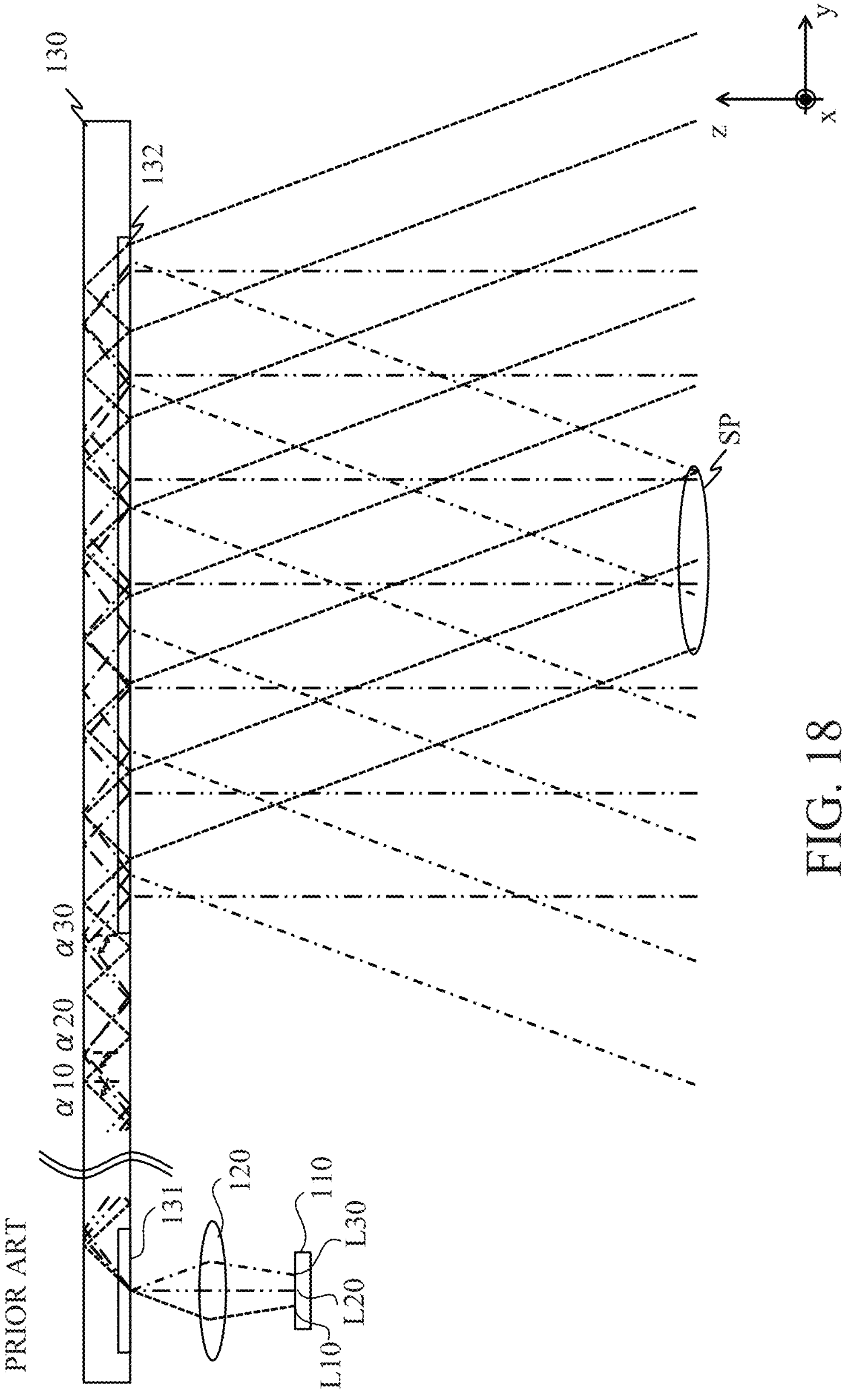
FIG. 18 is a conceptual diagram of a light beam propagating inside a light guide plate in a conventional image display apparatus.

A film configuration of the dielectric multilayer film of separation surfaces M4-1 and M4-4 is illustrated as numerical example 4. FIGS. 17A, 17B, and 17C illustrate the angular characteristic of the reflectance for S-polarized light of the dielectric multilayer film of the separation surfaces M4-1 and M4-4 at the dominant wavelengths of RGB light in Example 4. In a case where a position y=−4.0 [mm] of the observer's pupil SP is considered, the light from separation surface M4-1 is incident at an incident angle β of 10.0°, and the light from separation surface M4-4 is incident at an incident angle β of −5.0°. Reflectances R4-1 (31.6°), R4-4 (21.7°), and R4-4 (31.6°) for light with the dominant wavelength of the G light at the corresponding incident angles of the separation surfaces M4-1 and M4-4 are 16.7%, 12.8%, and 31.5%, respectively. A value R4-1 (31.6°)/R4-4 (21.7°) is 1.30. By setting the angular characteristic of the reflectance in this way to correct the relationship between the optical effective diameters of the separation surfaces, the light beams reflected on the respective separation surfaces at different exit angles become uniform, and uniform luminance can be realized.

NUMERICAL EXAMPLE 1 (UNIT: nm)

| FILM NO. | MATERIAL | M1-2 | M1-12 |
|---|---|---|---|
| 1 | $SIO_2$ | 10.0 | 87.1 |
| 2 | $TIO_2$ | 13.1 | 10.8 |
| 3 | $SIO_2$ | 69.9 | 76.5 |
| 4 | $TIO_2$ | 33.9 | 31.1 |
| 5 | $SIO_2$ | 25.3 | 24.4 |
| 6 | $TIO_2$ | 199.2 | 173.9 |
| 7 | $SIO_2$ | 10.0 | 10.0 |
| 8 | $TIO_2$ | 46.3 | 224.1 |
| 9 | $SIO_2$ | 40.8 | 10.0 |
| 10 | $TIO_2$ | 23.2 | 10.0 |
| 11 | $SIO_2$ | 91.2 | 38.4 |
| 12 | $TIO_2$ | 10.0 | 13.6 |
| 13 | $SIO_2$ | 159.4 | 208.6 |
| 14 | $TIO_2$ | 10.0 | 17.9 |
| 15 | $SIO_2$ | 102.1 | 41.1 |
| 16 | $TIO_2$ | 17.7 | 157.0 |
| 17 | $SIO_2$ | 29.7 | 20.2 |
| 18 | $TIO_2$ | 25.2 | 228.8 |
| 19 | $SIO_2$ | 21.4 | 10.0 |
| 20 | $TIO_2$ | 58.4 | 185.4 |

-continued

| FILM NO. | MATERIAL | M1-2 | M1-12 |
|---|---|---|---|
| 21 | $SIO_2$ | 25.8 | 22.2 |
| 22 | $TIO_2$ | 30.7 | 32.6 |
| 23 | $SIO_2$ | 53.8 | 14.0 |
| 24 | $TIO_2$ | 20.8 | 16.1 |
| 25 | $SIO_2$ | 62.2 | 60.8 |
| 26 | $TIO_2$ | 22.7 | 23.3 |
| 27 | $SIO_2$ | 33.2 | 100.3 |
| 28 | $TIO_2$ | 149.6 | 14.6 |
| 29 | $SIO_2$ | 39.2 | 99.3 |
| 30 | $TIO_2$ | 38.9 | 14.7 |
| 31 | $SIO_2$ | 46.2 | 85.3 |
| 32 | $TIO_2$ | 53.1 | 27.9 |
| 33 | $SIO_2$ | 14.7 | 42.6 |
| 34 | $TIO_2$ | 67.2 | 134.5 |
| 35 | $SIO_2$ | 33.8 | 31.2 |
| 36 | $TIO_2$ | 25.6 | 19.3 |
| 37 | $SIO_2$ | 86.3 | 64.6 |
| 38 | $TIO_2$ | 10.0 | 10.0 |
| 39 | $SIO_2$ | 30.1 | 19.1 |

NUMERICAL EXAMPLE 2 (UNIT: nm)

| FILM NO. | MATERIAL | M2-2 | M2-5 |
|---|---|---|---|
| 1 | $SIO_2$ | 10.0 | 36.7 |
| 2 | $TIO_2$ | 19.1 | 10.0 |
| 3 | $SIO_2$ | 49.4 | 90.4 |
| 4 | $TIO_2$ | 52.9 | 21.9 |
| 5 | $SIO_2$ | 36.5 | 49.2 |
| 6 | $TIO_2$ | 33.8 | 63.6 |
| 7 | $SIO_2$ | 84.1 | 22.6 |
| 8 | $TIO_2$ | 15.2 | 42.3 |
| 9 | $SIO_2$ | 105.9 | 71.1 |
| 10 | $TIO_2$ | 13.1 | 13.0 |
| 11 | $SIO_2$ | 124.7 | 10.0 |
| 12 | $TIO_2$ | 13.4 | 10.0 |
| 13 | $SIO_2$ | 97.5 | 85.5 |
| 14 | $TIO_2$ | 26.6 | 29.8 |
| 15 | $SIO_2$ | 41.1 | 41.9 |
| 16 | $TIO_2$ | 147.1 | 151.8 |
| 17 | $SIO_2$ | 10.0 | 15.4 |
| 18 | $TIO_2$ | 270.2 | 257.2 |
| 19 | $SIO_2$ | 40.3 | 22.3 |
| 20 | $TIO_2$ | 29.2 | 58.7 |
| 21 | $SIO_2$ | 84.2 | 38.3 |
| 22 | $TIO_2$ | 10.0 | 29.0 |
| 23 | $SIO_2$ | 278.4 | 242.5 |
| 24 | $TIO_2$ | 16.9 | 16.0 |
| 25 | $SIO_2$ | 53.8 | 38.1 |
| 26 | $TIO_2$ | 141.3 | 136.9 |
| 27 | $SIO_2$ | 54.9 | 62.6 |
| 28 | $TIO_2$ | 20.4 | 15.0 |
| 29 | $SIO_2$ | 104.9 | 99.4 |
| 30 | $TIO_2$ | 11.6 | 17.1 |
| 31 | $SIO_2$ | 104.9 | 94.2 |
| 32 | $TIO_2$ | 10.1 | 21.4 |
| 33 | $SIO_2$ | 114.0 | 53.7 |
| 34 | $TIO_2$ | 11.7 | 58.2 |
| 35 | $SIO_2$ | 97.1 | 31.4 |
| 36 | $TIO_2$ | 10.0 | 29.5 |

NUMERICAL EXAMPLE 3 (UNIT: nm)

| FILM NO. | MATERIAL | M3-2 | M3-6 |
|---|---|---|---|
| 1 | $TIO_2$ | 20.2 | 19.7 |
| 2 | $SIO_2$ | 44.9 | 64.7 |
| 3 | $TIO_2$ | 47.5 | 23.2 |
| 4 | $SIO_2$ | 27.0 | 87.6 |
| 5 | $TIO_2$ | 67.9 | 44.4 |
| 6 | $SIO_2$ | 42.3 | 37.5 |
| 7 | $TIO_2$ | 31.2 | 26.8 |
| 8 | $SIO_2$ | 53.0 | 51.0 |
| 9 | $TIO_2$ | 64.7 | 10.0 |
| 10 | $SIO_2$ | 17.3 | 10.0 |
| 11 | $TIO_2$ | 111.6 | 183.5 |
| 12 | $SIO_2$ | 10.0 | 10.0 |
| 13 | $TIO_2$ | 50.6 | 75.8 |
| 14 | $SIO_2$ | 18.1 | 10.0 |
| 15 | $TIO_2$ | 149.5 | 146.1 |
| 16 | $SIO_2$ | 199.6 | 169.9 |
| 17 | $TIO_2$ | 37.6 | 40.3 |
| 18 | $SIO_2$ | 177.7 | 168.5 |
| 19 | $TIO_2$ | 140.7 | 147.7 |
| 20 | $SIO_2$ | 38.2 | 10.9 |
| 21 | $TIO_2$ | 39.4 | 53.5 |
| 22 | $SIO_2$ | 56.9 | 20.7 |
| 23 | $TIO_2$ | 38.1 | 24.7 |
| 24 | $SIO_2$ | 38.9 | 19.1 |
| 25 | $TIO_2$ | 146.1 | 158.5 |
| 26 | $SIO_2$ | 80.3 | 122.5 |
| 27 | $TIO_2$ | 32.7 | 15.0 |
| 28 | $SIO_2$ | 72.4 | 35.1 |
| 29 | $TIO_2$ | 20.7 | 26.1 |
| 30 | $SIO_2$ | 115.0 | 183.2 |
| 31 | $TIO_2$ | 21.4 | 10.0 |
| 32 | $SIO_2$ | 82.1 | 56.0 |
| 33 | $TIO_2$ | 30.5 | 19.2 |
| 34 | $SIO_2$ | 82.3 | 57.3 |
| 35 | $TIO_2$ | 18.2 | 17.8 |
| 36 | $SIO_2$ | 97.1 | 212.3 |
| 37 | $TIO_2$ | 22.7 | 26.2 |

NUMERICAL EXAMPLE 4 (UNIT: nm)

| FILM NO. | MATERIAL | M4-1 | M4-4 |
|---|---|---|---|
| 1 | $TIO_2$ | 21.1 | 14.8 |
| 2 | $SIO_2$ | 72.9 | 67.6 |
| 3 | $TIO_2$ | 18.5 | 23.3 |
| 4 | $SIO_2$ | 65.0 | 58.7 |
| 5 | $TIO_2$ | 63.3 | 128.7 |
| 6 | $SIO_2$ | 21.8 | 10.0 |
| 7 | $TIO_2$ | 55.8 | 10.0 |
| 8 | $SIO_2$ | 43.3 | 51.7 |
| 9 | $TIO_2$ | 33.7 | 26.8 |
| 10 | $SIO_2$ | 87.3 | 69.4 |
| 11 | $TIO_2$ | 11.3 | 16.7 |
| 12 | $SIO_2$ | 103.7 | 136.8 |
| 13 | $TIO_2$ | 15.7 | 14.2 |
| 14 | $SIO_2$ | 52.0 | 49.2 |
| 15 | $TIO_2$ | 16.4 | 16.9 |
| 16 | $SIO_2$ | 210.7 | 198.6 |
| 17 | $TIO_2$ | 30.6 | 30.3 |
| 18 | $SIO_2$ | 209.3 | 222.5 |
| 19 | $TIO_2$ | 10.0 | 23.0 |
| 20 | $SIO_2$ | 29.4 | 69.0 |
| 21 | $TIO_2$ | 22.1 | 19.6 |
| 22 | $SIO_2$ | 75.6 | 127.9 |
| 23 | $TIO_2$ | 16.0 | 35.9 |
| 24 | $SIO_2$ | 84.5 | 28.0 |
| 25 | $TIO_2$ | 139.6 | 157.0 |
| 26 | $SIO_2$ | 44.6 | 48.9 |
| 27 | $TIO_2$ | 39.6 | 37.9 |
| 28 | $SIO_2$ | 74.9 | 47.4 |
| 29 | $TIO_2$ | 23.4 | 24.4 |
| 30 | $SIO_2$ | 77.4 | 29.7 |
| 31 | $TIO_2$ | 32.3 | 10.0 |
| 32 | $SIO_2$ | 65.0 | 45.4 |
| 33 | $TIO_2$ | 39.9 | 34.9 |
| 34 | $SIO_2$ | 53.0 | 79.5 |

-continued

| FILM NO. | MATERIAL | M4-1 | M4-4 |
|---|---|---|---|
| 35 | $TIO_2$ | 35.6 | 18.1 |
| 36 | $SIO_2$ | 57.8 | 47.7 |
| 37 | $TIO_2$ | 16.7 | 11.3 |

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide an image display apparatus that has high light utilization efficiency and uniform luminance over an angle-of-field range incident on a pupil of an observer.

This application claims priority to Japanese Patent Application No. 2023-172700, which was filed on Oct. 4, 2023, and which is hereby incorporated by reference herein in its entirety.

What is claimed is:

1. An image display apparatus comprising:

an image display element configured to emit image light; and a light guide plate that includes an entrance portion which the image light enters, and an exit portion from which the image light exits, wherein the exit portion includes, in order from an entrance portion side, a first separation surface, and a second separation surface, each of the first separation surface and the second separation surface being configured to separate incident light into reflected light and transmitting light, and wherein the following inequalities are satisfied:

$$R2(\theta 2) < R1(\theta 1) < R2(\theta 1)$$

$$\theta 1 = 90 - (\theta M - S(\beta 1))$$

$$\theta 2 = 90 - (\theta M - S(\beta 2))$$

$$S(\theta) = \sin\verb|^|(-1)(\sin(\theta)/n)$$

$$\beta 1 > \beta 2$$

where β1 is an incident angle [°] of light incident from the first separation surface to a predetermined position in an eyebox, β2 is an incident angle [°] of the light incident from the second separation surface to the predetermined position, θM is an angle [°] between the first separation surface or the second separation surface and a surface normal of the light guide plate, n is a refractive index of the light guide plate for light with a predetermined wavelength included in a band of the image light, R1(θ) is a reflectance of the light with the predetermined wavelength incident on the first separation surface at an incident angle θ[°], and R2(θ) is a reflectance of the light with the predetermined wavelength incident on the second separation surface at the incident angle θ[°].

2. The image display apparatus according to claim 1, wherein each of the first separation surface and the second separation surface includes a dielectric multilayer film.

3. The image display apparatus according to claim 2, wherein the dielectric multilayer film reflects S-polarized light and transmits P-polarized light, and the following inequality is satisfied:

$$0 < \theta M < 45.$$

4. The image display apparatus according to claim 3, wherein the following inequality is satisfied:

$$1.0 < R1(\theta 1)/R2(\theta 2) < 5.0.$$

5. The image display apparatus according to claim 3, wherein the following inequality is satisfied:

$$85 - \theta M \leq \kappa \leq 95 - \theta M$$

$$k = \sin^{-1}\sqrt{\frac{n_H^2 n_L^2}{n^2(n_H^2 + n_L^2)}}$$

where $n_H$ is a refractive index of a high refractive index film constituting the dielectric multilayer film for the light with the predetermined wavelength, and nu is a refractive index of a low refractive index film constituting the dielectric multilayer film for the light with the predetermined wavelength.

6. The image display apparatus according to claim 2, wherein the dielectric multilayer film reflects P-polarized light and transmits S-polarized light, and the following inequality is satisfied:

$$45 < \theta M < 90.$$

7. The image display apparatus according to claim 6, wherein the following inequality is satisfied:

$$1.0 < R1(\theta 1)/R2(\theta 2) < 4.0.$$

* * * * *